US008634418B2

(12) United States Patent
Kwong et al.

(10) Patent No.: US 8,634,418 B2
(45) Date of Patent: Jan. 21, 2014

(54) PROVIDING EXTENDED ADMINISTRATIVE GROUPS IN COMPUTER NETWORKS

(75) Inventors: Ambrose Kwong, Westford, MA (US); Nischal Sheth, Los Altos, CA (US); Hannes Gredler, Pillberg (AT); Nitin Bahadur, Santa Clara, CA (US); Harish Sitaraman, Waldham, MA (US); Avneesh Sachdev, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 166 days.

(21) Appl. No.: 13/174,962

(22) Filed: Jul. 1, 2011

(65) Prior Publication Data

US 2013/0003728 A1     Jan. 3, 2013

(51) Int. Cl.
*H04L 12/28* (2006.01)

(52) U.S. Cl.
USPC ............ 370/389; 370/255; 370/256; 370/400

(58) Field of Classification Search
USPC ......... 370/252–256, 230–238, 392, 389, 400, 370/401, 349, 338, 397–399, 229
See application file for complete search history.

(56) References Cited

U.S. PATENT DOCUMENTS

| | | | | |
|---|---|---|---|---|
| 5,570,084 | A * | 10/1996 | Ritter et al. | 370/338 |
| 7,522,603 | B2 * | 4/2009 | Vasseur | 370/392 |
| 7,602,778 | B2 | 10/2009 | Guichard et al. | |
| 7,710,872 | B2 * | 5/2010 | Vasseur | 370/230 |
| 7,808,919 | B2 | 10/2010 | Nadeau et al. | |
| 2003/0137978 | A1 | 7/2003 | Kanetake | |
| 2004/0042406 | A1 * | 3/2004 | Wu et al. | 370/238 |
| 2004/0223497 | A1 | 11/2004 | Sanderson et al. | |
| 2005/0220014 | A1 | 10/2005 | DelRegno et al. | |
| 2008/0025309 | A1 * | 1/2008 | Swallow | 370/392 |
| 2008/0056264 | A1 * | 3/2008 | Ong | 370/392 |
| 2008/0151768 | A1 * | 6/2008 | Liu | 370/252 |
| 2008/0151783 | A1 * | 6/2008 | Bamba | 370/254 |
| 2010/0208741 | A1 * | 8/2010 | Vasseur | 370/400 |

OTHER PUBLICATIONS

Rosen et al., "MPLS Label Stack Encoding," RFC 3032, Network Working Group, Jan. 2001, 24 pp.
Osborne, Eric and Ajay Simha "How CSPF Works" Traffic Engineering with MPLS: Chapter 4, Publisher: Cisco Press, Jul. 17, 2002, available at http://cisco-press-traffic-engineering.org.ua/1587050315/ch04lev1sec2.html (accessed Jun. 21, 2011).
Katz et al. "Traffic Engineering (TE) Extensions to OSPF Version 2" Network Working Group, RFC 3630, Sep. 2003, 14 pgs.
Extended European Search Report dated Jul. 9, 2013 in corresponding EP Application No. 12173936.1, 7 pgs.

* cited by examiner

*Primary Examiner* — Robert Wilson
*Assistant Examiner* — Sai Aung
(74) *Attorney, Agent, or Firm* — Shumaker & Sieffert, P.A.

(57) ABSTRACT

In general, techniques are described for providing extended administrative groups in networks. A network device comprising an interface and a control unit may implement the techniques. The interface receives a routing protocol message that advertises a link. This message includes a field for storing first data associated with the link in accordance with the routing protocol. The field is defined by the routing protocol as a field having a different function from an administrative group field defined by the same routing protocol. The control unit determines that this field has been repurposed to store second data, wherein this second data specifies an extended administrative group for the link different from those that may be specified by the administrative group field. The control unit then updates routing information to associate the advertised link with the extended administrative group and performs path selection to select paths based on the updated routing information.

30 Claims, 5 Drawing Sheets

PROVIDING EXTENDED ADMINISTRATIVE GROUPS IN COMPUTER NETWORKS

TECHNICAL FIELD

The invention relates to computer networks and, more specifically, configuring computer networks.

BACKGROUND

Typically, a device responsible for routing data through a computer network, such as a router, implements one or more intra-network routing protocols commonly referred to as interior gateway protocols (IGPs) to exchange so-called "routing information" describing links or paths within the network domain. Example IGPs include an Intermediate System to Intermediate System (IS-IS) routing protocol and an Open Shortest Path First (OSPF) routing protocol. Each router may then resolve the routing information by selecting a path through the network for reaching each available destination within the network and generating forwarding information, which may be used to forward data packets through the computer network.

Both the IS-IS and OSPF routing protocols fall within a class of routing protocols referred to as link-state protocols. Link state protocols advertise or otherwise facilitate the exchange of routing information by generating and transmitting link state advertisements (which may also be referred to as "Link State Protocol Data Units") describing a state of a link between any two adjacent routers within the computer network. These link state advertisements may include information identifying an interface cost or metric associated with an interface to which the link connects and a link cost or metric associated with the link, as well as a color or administrative group associated with the link and any other constraints commonly employed for selecting a path through a network in accordance with a link state protocol. The administrative group associated with the link (often referred to as a "color" or resource class for the link) may provide a way by which an administrator can control path selection.

For example, an administrator may assign one or more links a color of "red" and another one or more links a color of "blue." The administrator may then configure the path selection algorithm that selects from among the entire set of paths determined via link state advertisements to utilize only links that are associated with the color "red" for one customer and to utilize only links that are associated with the color "blue" for another customer. In this manner, the administrator may configure groups of links for different uses. Commonly, administrators utilize these colors to differentiate between links that cannot be differentiated by more objective metrics. In this way, the color or administrative group fields of link state advertisements enable what may be considered a more subjective metric or constraint of path selection. The growth of networks and the increase in the number of network devices has complicated administration beyond what the developers of these protocols imagined. In some instances, these protocols may fail to adequately accommodate a large number of administrative groups, which may burden administration of larger networks by limiting how path selection is performed.

SUMMARY

In general, techniques are described for providing extended administrative groups in computer networks. Moreover, the techniques provide an efficient mechanism for communicating the extended administrative groups between routers in a manner that does not require extensive modification to existing routing protocols.

For example, rather than provide for only 32 different administrative groups as is common in interior gateway protocols (IGPs), such as the IS-IS and OSPF protocols, the techniques may repurpose an existing type-length-value (TLV) field (or at least a portion thereof) that is already defined by the protocols for defining a shared risk link group (SRLG) to define extended administrative groups. In this manner, the function of TLV may be overloaded to support two different purposes. Moreover, an address space associated with the SRLG function may be partitioned into two discrete spaces: one of SRLG and one for extended administrative groups. By repurposing this SRLG TLV, the administrator may configure routers to define an administrative group outside of the customary limit of 32 administrative groups supported by IS-IS and OSPF protocols, thereby overcoming the 32 administrative group limitation without adding any additional TLVs. As such, only portions of the routing protocol responsible for parsing an SRLG sub-TLV or SRLG TLV need to be modified to account for the address space partitioning. Object types for a new TLV need not be defined for distributing the extended administrative group information. In providing this extended administrative group, the administrator may tailor path selection in a more granular manner in comparison to conventional IPGs, as the additional administrative groups or "colors" may add additional criteria or metrics on which the path selection algorithm may base path selection.

In one embodiment, a method comprises receiving, with a network device, a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol. The method also comprises determining, with the network device, that the field of the received routing protocol message has been repurposed to store second data in addition to the first data, wherein the second data specifies one or more extended administrative groups for the link different from the one or more administrative groups that are to be specified by the administrative group field, upon determining that the field has been repurposed, updating routing information to associate the advertised link with the one or more extended administrative groups specified by the second data and performing, with the network device, path selection to select one or more paths based on the updated routing information.

In another embodiment, a network device comprises at least one interface that receives a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol. The network device further comprises a control unit that determines that the field of the received routing protocol message has been repurposed to store second data in addition to the first data, wherein the second data specifies one or more extended administrative groups for the link different from the one or more administrative groups that are to be specified by the administrative group field, upon determining that the field has been repurposed, update routing information to associate the advertised link with the one or more extended administrative groups specified by the second data and perform path selection to select one or more paths based on the updated routing information.

In another embodiment, a network system comprises two or more customer networks and a transport network that includes a plurality of routers, wherein at least two of the plurality of routers couple the two or more customer networks to the transport network. The first one of the plurality of routers includes at least one interface that receives a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol. The first one of the plurality of routers also includes a control unit that determines that the field of the received routing protocol message has been repurposed to store second data in addition to the first data, wherein the second data specifies one or more extended administrative groups for the link different from the one or more administrative groups that are to be specified by the administrative group field, upon determining that the field has been repurposed, update routing information to associate the advertised link with the one or more extended administrative groups specified by the second data and perform path selection to select one or more paths based on the updated routing information.

In another embodiment, a non-transitory computer-readable device comprising instructions that, when executed, cause one or more processors to receive a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol, determine that the field of the received routing protocol message has been repurposed to store second data in addition to the first data, wherein the second data specifies one or more extended administrative groups for the link different from the one or more administrative groups that are to be specified by the administrative group field, upon determining that the field has been repurposed, update routing information to associate the advertised link with the one or more extended administrative groups specified by the second data and perform path selection to select one or more paths based on the updated routing information.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
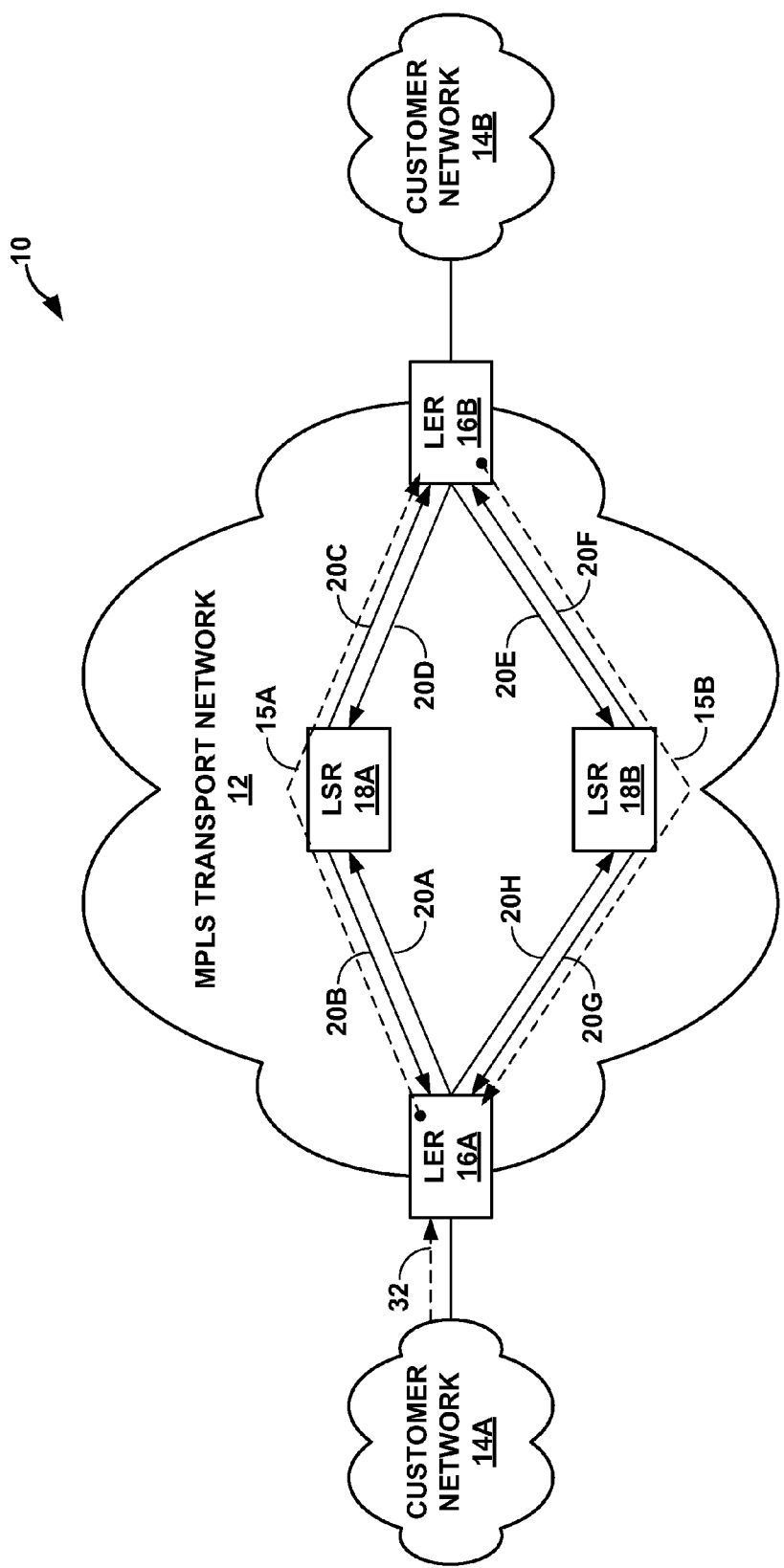
FIG. 1 is a block diagram illustrating an example network system that implements the extended administrative group techniques described in this disclosure.

FIG. 1 is a block diagram illustrating an example network system 10 that implements the extended administrative group techniques described in this disclosure. In the example of FIG. 1, network system 10 includes a multi-protocol label switching (MPLS) transport network 12 and customer networks 14A, 14B ("customer networks 14"). MPLS transport network 12 represents a network that transports packets or other data units between networks, such as customer networks 14. MPLS transport network 12 may represent a service provider network that implements one or more MPLS protocols, such as a resource reservation protocol (RSVP) or a label distribution protocol (LDP), to configure one or more label switched paths (LSPs) through MPLS transport networks 12. These LSPs may be dedicated paths for use in communicating between two or more networks, such as customer networks 14.

Customer networks 14 may represent private networks that are owned and operated by a business, government organization or other entity. In this example, it is assumed that both of customer networks 14 are owned and operated by the same entity and that this entity has contracted with the service provider that owns and operates MPLS transport network 12 so as to interconnect customer networks 14 via MPLS transport network 12. In order to facilitate this interconnection, an administrator of the service provider may configure MPLS transport network 12 to provide a first LSP 15A interconnecting customer network 14A to customer network 14B and a second LSP 15B interconnecting customer network 14B to customer network 14A, as LSPs typically only provide a unidirectional form of communication. Thus, in order to provide bidirectional communication between customer networks 14, the administrator configures MPLS transport network 12 to provide these first and second LSPs 15A, 15B ("LSPs 15") between customer networks 14, where LSP 15A enables communications from customer network 14A to reach customer network 14B and LSP 15B enables communications from customer network 14B to reach customer network 14A.

As shown further in the example of FIG. 1, MPLS transport network 12 includes label edge routers (LERs) 16A, 16B ("LERs 16") and label switch routers (LSRs) 18A, 18B ("LSRs 18"). LERs 16 may, in some instances, be substantially similar to LSRs 18 in that the same type of device, e.g. a router, may perform the functions attributed to both LERs 16 and LSRs 18. LERs 16 typically differ in their operation from LSRs 18 in that LERs 16 perform a process referred to as "call admission control" to admit or deny packet flows or other traffic entry into LSPs originating from LERs 16. Typically, call admission control involves identifying a five-tuple associated with a packet and determining whether this five-tuple is associated with any one of LSPs 14, where the five-tuple includes a source address, a source port, a destination address, a destination port and a protocol. LSRs 18 typically do not perform call admission control and instead switch MPLS packets via the associated one of the LSPs to which this MPLS packet has been admitted.

Typically, to establish or otherwise form LSPs 16, each of LERs 16 and LSRs 18 exchange routing information that describes one or more routes through MPLS transport network 12. In this example, LERs 16 and LSRs 18 implement one or more of a type of routing protocol referred to as an interior gateway protocol (IGP). IGPs generally refer to a type or class of routing protocols used to exchange routing information within a given area or so-called "autonomous system." MPLS transport network 12 is assumed to represent a single autonomous system, which may refer to a network composed of a collection of connected Internet protocol (IP) routing prefixes under the control of one or more network operators that presents a common, clearly defined routing policy.

Example IGPs include an Intermediate System to Intermediate System (IS-IS) routing protocol and an Open Shortest Path First (OSPF) routing protocols. Both of the IS-IS and OSPF routing protocols fall within a class of routing protocols referred to as link-state protocols. Link-state protocols generally advertise routing information via link state advertisements (LSAs), where the LSAs are shown in the example of FIG. 1 as LSAs 20A-20H ("LSAs 20"). These LSAs 20 include data identifying a link between any two routers of MPLS transport network 12, along with data identifying various metrics describing a state of this link. For example, LSAs 20 may include data defining an interface cost or metric associated with an interface to which the link connects and a link cost or metric associated with the link, as well as, a color or administrative group associated with the link and any other constraints commonly employed for selecting a path through a network in accordance with a link state protocol. The administrative group associated with the link (or "color") may provide a way by which an administrator can configure path selection.

The phrase "path selection" generally refers to an algorithm implemented by various protocols to resolve routing information (which in this example is advertised via LSAs 20) to select a path through the network. Typically, LERs 16 and LSRs 18 exchange LSAs 20 that describe links of which each of LERs 16 and LSRs 18 have been informed, e.g., either by way of directly connecting to these links or by way of another LSA. LERs 16 and LSRs 18 then form a graph or other data structure to store the routing information in a manner that reflects the topology of MPLS transport network 12. That is, LERs 18 and LSRs 18 may form a graph data structure with each node of the graph representing a different one of LERs 16 and LSRs 18 and each pointer or so-called "edge" interconnecting two nodes of the graph representing a different link between a corresponding two of LERs 16 and LSRs 18. Each pointer or edge of the graph may be associated with a cost or other edge value that reflects the costs advertised via LSA 20 for each of the associated links. LERs 16 and LSRs 18 may then implement a substantially similar, if not the same, path selection algorithm to determine a path through the network for each source and destination of data packets.

In the context of MPLS transport network 12, LERs 16 and LSRs 18 implement a path selection algorithm identified by one of the MPLS protocols. Typically, MPLS protocols, especially those that provide a traffic engineering aspect, such as RSVP traffic engineering (RSVP-TE) implement a path selection algorithm referred to as constrained shortest path first (CSPF) path selection algorithm. The CSPF path selection algorithm differs from the generic shortest path first (SPF) path selection algorithm in that the CSPF path selection algorithm first prunes those links that violate a given set of constraints. An administrator may configure each of LERs 16 and LSRs 18 to define the set of constraints so as to achieve a particular administrative or network goal, such as avoiding links having a certain high cost, which may achieve a latency goal by avoiding high cost links. After pruning these links from consideration, the CSPF path selection algorithm selects a path in a manner substantially similar to how the SPF path selection algorithm operates, e.g., by finding a lowest cost path from each node to every other node.

As noted above, one constraint considered by the CSPF path selection algorithm involves an administrative group, which may also be referred to as a "color" when these groups are color coded. Typically, the network administrator configures a link with one or more colors to accomplish more subject routing or administrative goals. For example, an administrator may assign one or more links a color of "red" and another one or more links a color of "blue." The administrator may then configure the CSPF path selection algorithm to selects only those links that are associated with the color "red" for one customer and to utilize only those links that are associated with the color "blue" for another customer. In this manner, the administrator may configure groups of links for use by different customer to generally balance load across these links. Commonly, administrators utilize these colors to differentiate between links that cannot be differentiated by more objective metrics. In this way, the color or administrative group fields of link state advertisements enable what may be considered a more subjective metric or constraint of path selection. The growth of networks and the increase in the number of network devices has complicated administration beyond what the developers of these protocols imagined. In some instances, these protocols may fail to adequately accommodate a large number of administrative groups, which may burden administration of larger networks by limiting how path selection is performed.

To illustrate, currently both of the IS-IS and OSPF routing protocols provide a 32-bit field for defining 32 different administrative groups. In large networks having hundreds, thousands or potentially hundreds of thousands of customers per a given autonomous system that each subscribe to one or more of a large set of services, the 32 different administrative groups may not be sufficient to accomplish different routing or administrative tasks, such as reserving certain links through the network for customers. Typically, these administrative groups are used to code or otherwise color a link based on the bandwidth or latency characteristics of the link. Given the increase in services provided over packet-switched networks to these various customers, different link characteristics are sought to provide these services. The various different combination of link characteristics that support each service, including each class of service, the number of different combinations of link characteristics may far exceed the number of administrative groups allowed currently by the IS-IS and/or OSPF protocol.

In accordance with the techniques described in this disclosure, rather than provide for only 32 different administrative groups as is common in interior gateway protocols (IGPs), such as the IS-IS and OSPF protocols, LERs 16 and LSRs 18 may repurpose an existing type-length-value (TLV) field (or at least a portion thereof) used for defining a shared risk link group (SRLG) so as to define extended administrative groups. The term "repurpose" as used in this disclosure indicates that a portion of the values of the SRLG TLV may be repurposed to define one or more extended administrative groups and should not be construed to mean that all of the values of the SRLG TLV field have been repurposed. Thus, the use of the term "repurpose" is intended to indicate that the SRLG TLV field has been redefined to define, in some instances, one or more extended administrative groups in addition to SRLGs although in some configurations, an administrator may entirely repurpose all of the values of the SRLG field to define extended administrative groups without leaving any values to define SRLGs.

In any event, by repurposing at least a portion of this SRLG TLV so as to identify extended administrative groups, the administrator may configure LERs 16 and LSRs 18 to define an administrative group outside of the customary 32 administrative groups inherently supported by IS-IS and OSPF protocols, thereby overcoming the 32 administrative group limitation without adding any additional TLVs. In providing this extended administrative group, the administrator may tailor path selection in a more granular manner in comparison to conventional IPGs, as the additional administrative groups or "colors" may add additional criteria or metrics on which the CSPF path selection algorithm may base path selection.

For example, LER 16A may receive a routing protocol message that advertises a link, such as LSA 20B, from LSR 18A. LSA 20B may include both a first administrative group field for storing data associating the link with one or more administrative groups in accordance with the link state routing protocol (e.g., IS-IS or OSPF) and a second field for storing second shared resource link group data associated with the link in accordance with the link state routing protocol. That is, the link state routing protocol may specify a format for LSA 20B that includes what are referred to as TLV fields, where the type portion of the TLV field identifies a type of the data specified in the value portion of the TLV field, the length portion of the TLV field identifies a length of the value portion of the TLV field and the value portion of the TLV field includes the data defining, in this case, the associated metric.

In the IS-IS routing protocol, the type portion of the Administrative Group sub-TLV field is set to three (3) to identify the value portion of this sub-TLV field as defining an administrative group, while the type portion of the SRLG sub-TLV field is set to 138 to identify the value portion of this sub-TLV field as defining a SRLG. More information regarding the IS-IS Administrative Group sub-TLV field can be found in request for comments (RFC) 5305, entitled "IS-IS Extensions for Traffic Engineering," which is hereby incorporated by reference as if set forth in its entirety herein. More information regarding the IS-IS SRLG sub-TLV field can be found in RFC 5307, entitled "IS-IS Extensions in Support of Generalized Multi-Protocol Label Switching (GMPLS)," which is hereby incorporated by reference as if set forth in its entirety herein.

In the OSPF protocol, the type portion of the Administrative Group sub-TLV field is set to nine (9) identify the value portion of this sub-TLV field as defining an administrative group, while the type portion of the SRLG sub-TLV field is set to 16 to identify the value portion of this sub-TLV field as defining a SRLG. More information regarding the OSPF Administrative Group sub-TLV field can be found in an RFC 3630, entitled "Traffic Engineering (TE) Extensions to OSPF version 2," which is hereby incorporated by reference as if set forth in its entirety herein. More information regarding the OSPF SRLG sub-TLV field can be found in RFC 4203, entitled "OSPF Extensions in Support of Generalized Multi-Protocol Label Switching (GMPLS)," which is hereby incorporated by reference as if set forth in its entirety herein.

In this instance, LER 16A receive LSA 20B that includes two sub-TLVs (which may also be generally referred to as TLVs for ease of discussion despite the fact that the LSA itself may represent a TLV and these TLVs may therefore represent sub-TLVs) with a first TLV including a type portion indicating that the corresponding value portion of this TLV identifies an administrative group associated with the advertised link and a second TLV including a type portion indicating that the corresponding value portion of this TLV identifies a SRLG. Yet, in accordance with the techniques described herein, LERs 16 and LSRs 18 may be configured to treat a certain range of values expressed in the SRLG TLV as defining an extended administrative group that are different from the administrative groups capable of being identified by the Administrative Group TLV. This range of values may be configured by the administrator.

Thus, upon receiving LSA 20B, LER 16A first determines whether the SRLG TLV field of LSA 20B has been repurposed for this LSA 20B to define data associating the link with one or more extended administrative groups different than the one or more administrative groups associated with the advertised link by the data stored to the Administrative Group TLV field. That is, LER 16A may parse the value stored to the value portion of the SRLG TLV field and compare this parsed value to the configured range of values that effectively repurpose this existing SRLG TLV field for this LSA for use in defining extended administrative groups. If the parsed value falls within the configured range (assuming it was configured for purposes of illustration), LER 16A then determines that the SRLG TLV field has been repurposed for this LSA in a manner inconsistent with the link state routing protocol to identify an extended administrative group instead of a SRLG. If the parsed value does not fall within the configured range, LER 16A determines that the SRLG TLV field has not been repurposed for this LSA but instead identifies an SRLG consistent with the link state routing protocol.

Upon determining that the SRLG TLV field has been repurposed for this LSA, LER 16A may update its stored routing information to associate the advertised link with the data stored to the value portion of the SRLG TLV field associating the advertised link with the extended administrative group. LER 16A may then perform path selection to select one or more paths through network 12 based on the updated routing information. The administrator may configure the CSPF path selection algorithm to consider these additional or extended administrative groups in much the same manner as the CSPF path selection algorithm currently considers administrative groups. That is, the CSPF path selection algorithm may prune or otherwise remove those links that violate a configured set of constraints, where these constraints have been expanded in accordance with the techniques described herein to include the extended administrative groups. By extending the CSPF path selection algorithm in this manner, the administrator may configure path selection in a more granular manner to consider more than just the 32 natively supported administrative groups.

Once path selection has been performed by LERs 16 and LSRs 18, each of LERs 16 and LSRs 18 may communicate labels associated by their corresponding advertising one of LERs 16 and LSRs 18 with each of these paths. Typically, labels are advertised from the one of LERs 16 that terminates the LSP (i.e., LER 16B terminates LSP 15A while LER 16A terminates LSP 15B in the example of FIG. 1) upstream to the one of LERs 16 that originates the LSP (i.e., LER 16A originates LSP 15A while LER 16B originates LSP 15B in the example of FIG. 1). The term "upstream" analogizes the direction or flow of traffic to that of a stream (considering that LSPs, like streams, are unidirectional) where upstream in this context refers to communications that are sent contrary the flow of traffic on the to-be-configured LSP while downstream refers to traffic that flows with the flow of traffic on the to-be-configured LSP.

To illustrate, consider LSP 15A, where LER 16B generates an MPLS label advertisement message associating the path of LSP 15A with a label allocated from its label space. The term "label space" may refer to a table or other data structure identifying labels that can be allocated to any path through network 12 running through the device that maintains this label space, which, in this instance, is LER 16B. LER 16B upon selecting this path by which to establish LSP 15A may then associate this path with a label allocated from its label space. LER 16B then generates an MPLS label advertisement and transmits this advertisement upstream to LSR 18A. LSR 18A receives this message, parses the association from the message and updates its routing information to reflect allocation of this label to LSP 15A by LER 16B. In response to this message, LSR 18A allocates a label from its label space to this path so as to further configure LSP 15A within MPLS transport network 12. LSR 18A may then update its routing information to associate its allocated label with that of the label advertised by LER 16B. LSR 18A may then generate and transmit its own MPLS label advertisement message so as to advertise the association of its allocated label with the likewise resolved path for LSP 15A (considering that each of LERs 16 and LSRs 18 implement the same path selection algorithm). LER 16A receives this MPLS advertisement, parses the association and updates its routing information to reflect the association by LSR 18A of its label to the path for LSP 15A, thereby configuring LSP 15A from LER 16A to LER 16B through MPLS transport network 12.

Once configured, LER 16A may receive packets from customer network 14A destined for customer network 14B. An administrator may have configured LER 16A to perform call admission control such that any packets with a source address associated with a device located within customer network 14A and a destination address associated with a device located within customer network 14B is to be permitted access to LSP 15A. Assuming this packet meets both the source address and destination address criteria for purposes of illustration, LER 16A may then associate the label advertised by LSR 18A for LSP 15A to the packet. Typically, LER 16A appends what is referred to as a "label stack" to the packet and pushes the label onto the stack to create what is commonly referred to as an "MPLS packet." LER 16A then forwards this packet to LSR 18A, which pops the label from the label stack and pushes the label advertised by LER 16B for LSP 15A onto the label stack. LSP 18A then forwards this updated packet to LER 16B, which receives the message, pops the label (effectively removing the label stack) and forwards the original packet to customer network 14B.

While the LSA is described above as including both an Administrative Group TLV and an SRLG TLV, the techniques may be implemented regardless of whether the LSA includes an Administrative Group TLV. In some instances, an administrator may only utilize the extended administrative groups using SRLG TLV without utilizing any of the administrative groups identified by Administrative Group TLV. Thus, while described in this disclosure as including both the Administrative Group TLV and the SRLG TLV for ease of illustration purposes, the techniques should not be limited in this respect.

Figure 2:
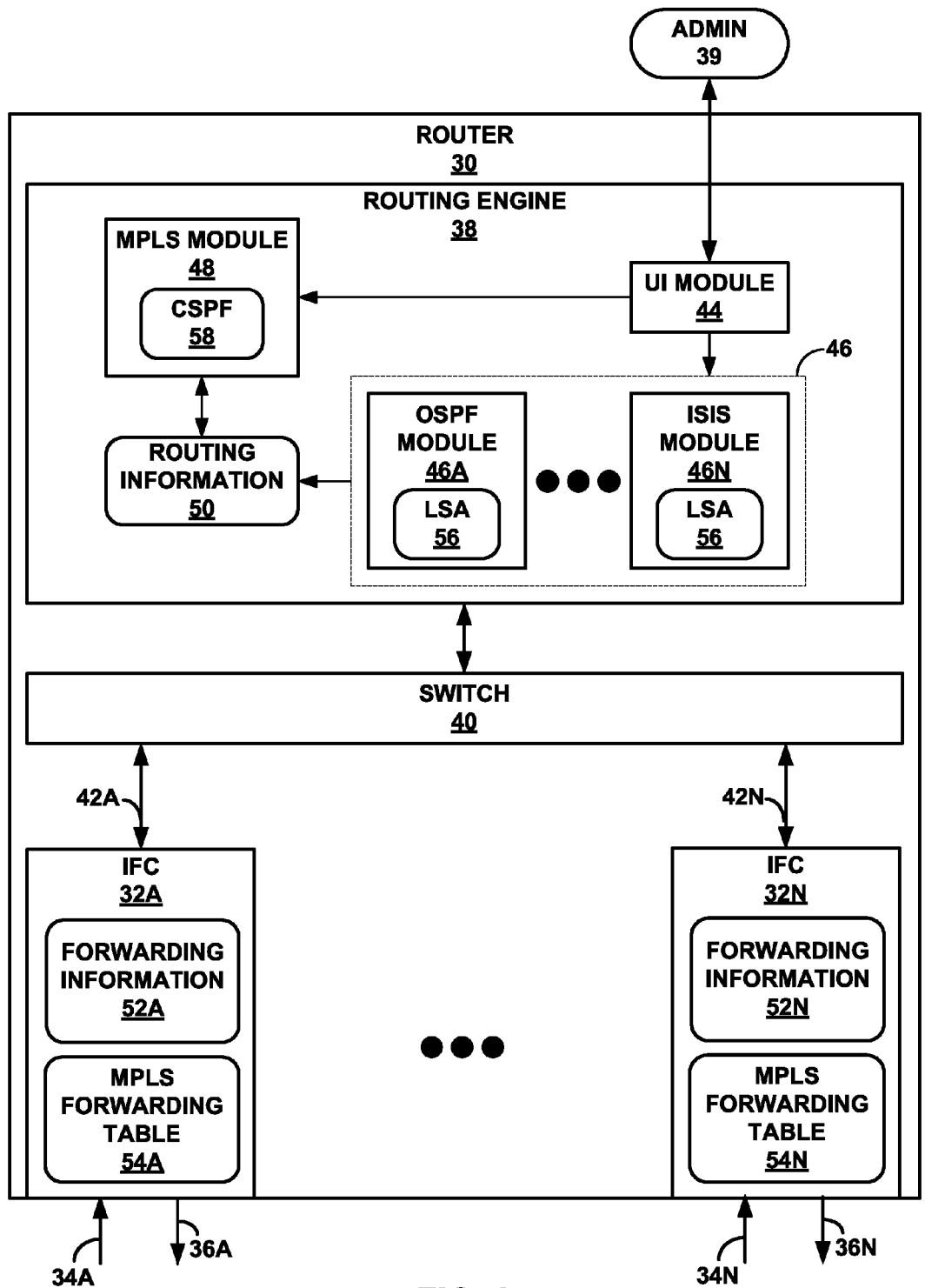
FIG. 2 is a block diagram illustrating an exemplary router that implements techniques described in this disclosure.

FIG. 2 is a block diagram illustrating an exemplary router 30 that implements techniques described in this disclosure. Router 30 may represent either one of LERs 16 or one of LSRs 18 shown in the example of FIG. 1. While described with respect to router 30, the techniques may be implemented by any other type of network device capable of implementing an interior gateway protocol (IGP), such as the IS-IS routing protocol or the OSPF routing protocol. Thus, while described with respect to router 30, the techniques should not be limited to exemplary router 30 described with respect to the example of FIG. 2.

In the exemplary embodiment of FIG. 2, router 30 includes interface cards 32A-32N ("IFCs 32") that receive and send data units, such as packet flows, via network links 34A-34N and 36A-36N, respectively. Router 30 may include a chassis (not shown) having a number of slots for receiving a set of cards, including IFCs 32. Each card may be inserted into a corresponding slot of the chassis for electrically coupling the card to routing engine 38 via high-speed switch 40 and internal data paths 42A-42N ("internal data paths 42").

Switch 40 also provides an interconnect path between each of IFCs 32. Switch 40 may comprise, for example, switch fabric, switchgear, a configurable network switch or hub, or other high-speed switching mechanisms. Internal data paths 42 may comprise any form of communication paths, such as electrical paths within an integrated circuit, external data busses, optical links, network connections, wireless connections, or other communication paths. IFCs 32 may be coupled to network links 34A-34N and 36A-36N via a number of physical interface ports (not shown). Generally, IFCs 32 may each represent one or more network interfaces by which router 30 may interface with links of a network, such as the links of network 12 shown in the example of FIG. 1.

In general, routing engine 38 operates as a control unit for router 30. Routing engine 38 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 38 may further include a non-transitory computer readable medium or other computer-readable storage device, which may include dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include or otherwise store instructions that, when executed, cause a programmable processor to perform the techniques described herein. These instructions may form a computer program, which may comprise software or other executable files.

Routing engine 38 may further include a user interface (UI) module 44 ("UI module 44"), one or more interior routing protocol modules 46A-46N ("interior routing protocol modules 46"), and an MPLS protocol module 48. UI module 44 may represent a module that presents a user interface with which an administrator or other user, such as administrator 39 ("admin 39"), may interact to configure one or more of interior routing protocol modules 46, as well as, routing engine 38 generally. Interior routing protocol modules 46 may, as shown in the example of FIG. 2, include an OSPF module 46A, an IS-IS module 46N and any other interior routing protocol. OSPF module 46A represents a module that implements the OSPF routing protocol in accordance with the OSPF RFCs incorporated by reference above. IS-IS module 46N represents a module that implements the IS-IS routing protocol in accordance with the IS-IS RFCs incorporated by reference above. MPLS protocol module 48 represents a module that implements the above describes signaling and path management protocols, such as the above described LDP, the above described RSVP (including traffic engineering aspects of RSVP, which is commonly referred to as RSVP-TE), or other MPLS protocols.

Routing engine 38 may further include and maintain routing information 50 that reflects a topology of a network. Interior routing protocol modules 46 may update routing information 34 or otherwise store data specifying the links of the network, including characteristics concerning these links, such as various costs and other metrics. Routing engine 38 may maintain routing information 50 in the form of one or more tables, databases, link lists, radix trees, databases, flat files, or any other data structure. Based on routing information 50, routing engine 38 generates forwarding information 52A-52N ("forwarding information 52") for IFCs 32. MPLS modules 48 may also, based on routing information 50 generate MPLS forwarding tables 54A-54N ("MPLS forwarding tables 54") for IFCs 32, where MPLS forwarding tables 54 correlate labels associated with incoming MPLS packets with next hops. MPLS forwarding tables 54 may each include entries associated with an incoming label (e.g., a label at the top of a label stack appended to a packet received by IFCs 32) and an operation or action to take with respect to that incoming label, such as push a new label onto the label stack, swap the incoming label with a label associated with the corresponding entry, or pop the incoming label from the label stack.

Each of the IFCs 32 includes a forwarding component (not shown) that forwards packets in accordance with forwarding information 52 and MPLS forwarding tables 54 generated by routing engine 38. Specifically, the forwarding components of IFCs 32 determine a next hop for each inbound IP packet (which may be differentiated from MPLS packets in that these IP packets do not include a label stack) based on forwarding information 52, identify the corresponding one of IFCs 32 associated with the next hop, and relay the packets to the appropriate one of IFCs 32 via switch 40 and corresponding ones of data paths 42. IFCs 32 may further include and maintain MPLS forwarding tables 54 for forwarding MPLS packets. IFCs 32 may receive an MPLS packet, identify a top label in the label stack, perform a lookup within MPLS forwarding table 42A based on the top label, and then perform the action associated with the entry identified in performing the lookup in MPLS forwarding table 42A based on this top label (which may involve a label push, label swap or label pop).

While described above as discrete modules 44-48, the modules may be combined to form a single module or unit or may be implemented separately as distinct hardware or software units. Reference to individual modules is not meant to reflect actual discrete implementations and more than one module may be implemented by the same hardware or combination of hardware or software.

Initially, admin 39 may interface with a user interface, such as a command line interface (CLI) or graphical-user interface (GUI), presented by UI module 44 to configure one or more of interior routing protocol modules 46. When configuring these protocols 46, admin 39 may input data specifying that at least a portion of the values of one or more fields of LSAs 56 generated by one or more of protocols 46 be repurposed for defining extended administrative groups in accordance with the techniques described in this disclosure. In configuring these protocols 46 in accordance with the techniques described in this disclosure, admin 39 may specify a range of values for the SRLG TLV field that, when specified, refer not to SRLGs but to extended administrative groups. Typically, admin 39 selects this range in a manner that does not overlap with any values that are presently or intended in the future to identify SLRGs. Admin 39 may also interface with the presented or another user interface of UI module 44 to define one or more extended administrative groups, which again represent administrative groups not generally specified or capable of being identified by the Administrative Group TLV of LSAs 56. Admin 39 may define an identifier that falls within the extended administrative group range discussed above and then associate this identifier with a color or other name or handle.

After configuring one or more of protocols 46 in this manner, admin 38 may also interface with a user interface presented by UI module 44 to configure MPLS module 48. In particular, admin 39 may input configuration data via this user interface that configures a constrained shortest path first (CSPF) algorithm executed by MPLS module 48 (which is shown in the example of FIG. 2 as "CSPF 58") to resolve routing information 50 in order to generate MPLS forwarding table 54. This configuration data to configure CSPF 58 may specify constraints CSPF 58 is to evaluate when resolving routing information 50. These constraints may include one or more of the extended administrative groups, which may be identified by the identifier assigned to these extended administrative groups by admin 39, e.g., the value in the administrative group range. Admin 39 may therefore configure CSPF 58 to consider or otherwise evaluate or assess extended administrative groups when pruning routing information 50 prior to selecting the shortest path, where length is typically measured in cost associated with each path. Admin 39 may also interface with a user interface to input link data associating one or more links with administrative groups and/or extended administrative groups, as well as, other costs or metrics. UI module 44 may store this link data to routing information 50 as a new entry or may update routing information 50 based on the input link data to reflect the new metrics or costs defined by this link data for the corresponding links.

After configuring routing engine 38 in this manner, admin 39 may then activate or otherwise enable router 30 to begin processing packets, including standard IP packets that are forwarded in accordance with forwarding information 52 and label augmented IP packets (which are referred to herein as "MPLS packets") that are forwarded in accordance with MPLS forwarding tables 54. Prior to receiving these packets, one or more of interior routing protocol modules 46 may generate an LSA 56 that includes data specifying one or more links, costs associated with the one or more links and other metrics associated with these links, such as an Administrative Group or Shared Risk Link Group (which again may be abbreviated as "SRLG"). For example, OSPF module 46A may, if configured to repurpose a portion of the values of the SLRG TLV field to specify an extended administrative group, generate LSA 56 to include both an Administrative Group TLV field associating one of the inherently supported 32 administrative groups with a link while also including the repurposed SLRG TLV field specifying an extended administrative group. Often, OSPF module 46A may generate LSA 56 such that it does not include the Administrative Group TLV field when repurposing the SLRG TLV field to specify an extended administrative group. In these instances, OSPF module 46A may generate LSA 56 to include the repurposed SLRG TLV field without including the Administrative Group TLV field. Regardless, OSPF module 46A may flood this LSA 56 via IFCs 32 throughout network 12. While described with respect to OSPF module 46A, IS-IS module 46N may operate in a manner similar to OSPF module 46A when generating its own LSA 56 and the techniques should not be limited in this respect to the example described herein.

Router 30 may also receive LSAs via IFCs 32 from other LERs or LSRs, such as LERs 16 or LSRs 18. IFCs 32 may be configured to forward routing protocol packets or control packets, such as these received LSAs, via switch 40 to routing engine 38. Interior routing protocol modules 46 may then process these LSAs, where one or more of these LSAs may include a repurposed SRLG TLV field. These routing protocol modules 46 may determine that any given SRLG TLV field is repurposed for this LSA to store an extended administrative group identifier rather than an SRLG identifier by first parsing the value stored to the SRLG TLV field and then comparing this value to the extended administrative group range configured by admin 39. If this parsed value is included within the configured administrative group range, the one of interior routing protocol modules 46 may determine that the SRLG TLV field has been repurposed for this LSA to store an extended administrative group identifier rather than an SRLG identifier. If this parsed value is not included within the configured administrative group range, the one of interior routing protocol modules 46 may determine that the SRLG TLV field has not been repurposed for this LSA to store an extended administrative group identifier but rather stores an SRLG identifier. This one of interior routing protocol modules 46 then stores link, including its costs and other metrics to routing information 50.

In response to updating routing information 50, MPLS module 48 may resolve routing information 50 or portions thereof (as routing information 50 may be divided into many different routing instances, such as a MPLS traffic engineering routing instance, an IP routing instance, etc.) to generate one or more of forwarding information 42 and MPLS forwarding tables 54. In response to updating an MPLS routing instances, such as an RSVP-TE routing instance, MPLS module 48 may invoke CSPF 58, which resolves its corresponding portion of routing information 50 in accordance with the configuration data entered by admin 39 to generate MPLS forwarding tables 54. MPLS module 48 may then configure or otherwise update IFCs 32 with the newly resolved MPLS forwarding table 54, replacing the older MPLS forwarding tables 54. IFCs 32 may continue to receive and forward IP packets and MPLS or labeled packets in accordance with forwarding information 52 and MPLS forwarding tables 54, respectively.

Figure 3A:
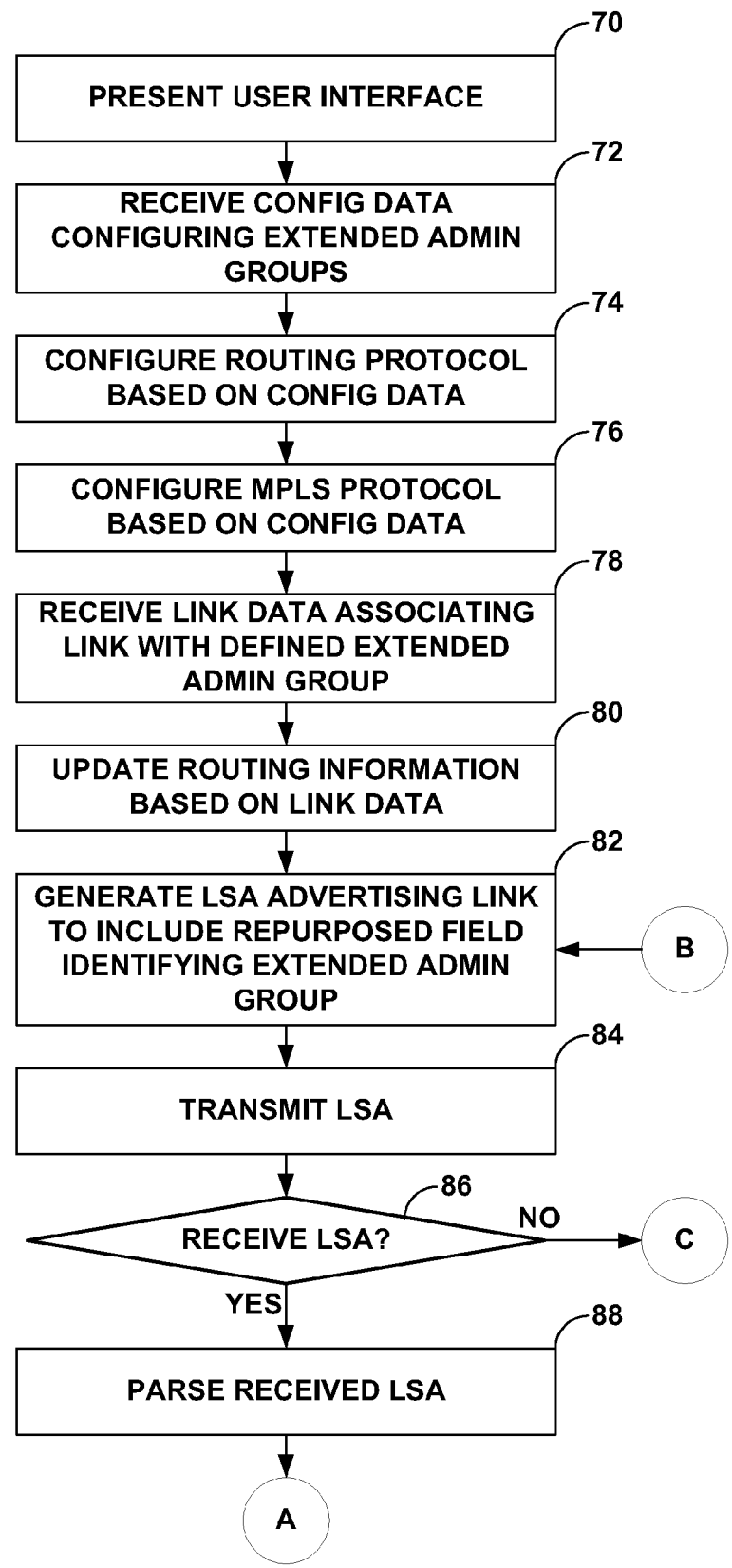
FIGS. 3A and 3B are flowcharts illustrating example operation of a network device in implementing the extended administrative group techniques described in this disclosure.
Figure 3B:
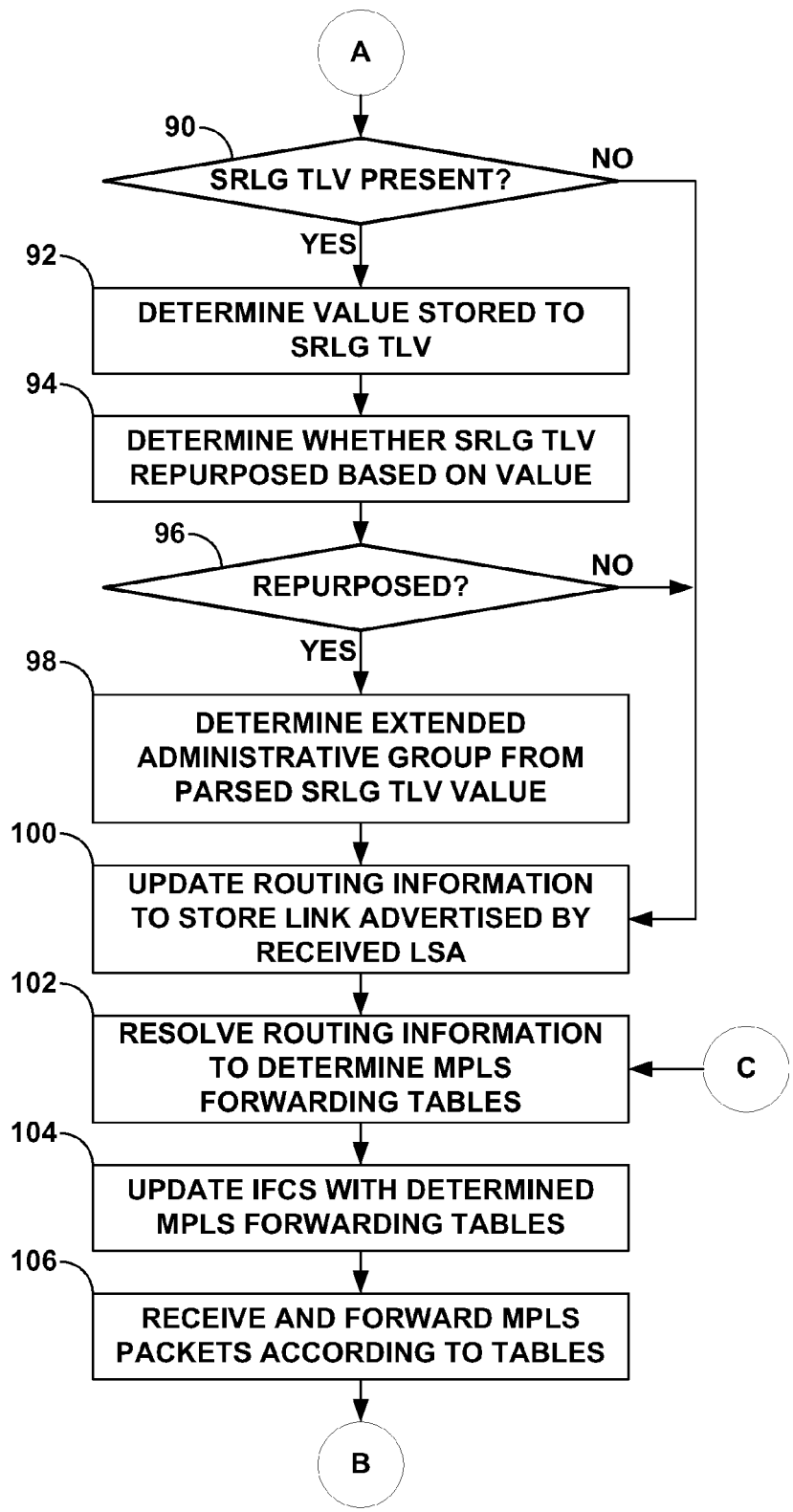

FIGS. 3A and 3B are flowcharts illustrating example operation of a network device, such as router 30 shown in the example of FIG. 2, in implementing the extended administrative group techniques described in this disclosure. Initially, referring first to the example operation shown in FIG. 3A, UI module 44 of router 30 presents a user interface with which admin 39 interfaces to input configuration data configuring extended administrative ("admin") groups (70). UI module 44 receives this configuration ("config") data configuring the extended admin groups (72). UI module 44 passes this configuration data to one or more of interior routing protocol modules 46, which configure their respective implementations of the routing protocol based on this received configuration data (74). As noted above, this configuration data may specify a range of values that define values stored to the SRLG TLV field (or any other defined TLV field) that have been repurposed to identify an extended administrative group for this LSA rather than a SRLG. In this way, the techniques may permit a portion of the values stored to the SRLG TLV field (or any other field for that matter) to be overridden to identify an extended administrative group rather than an SRLG contrary to RFCs or other standards that may define accepted or conventional formats of LSAs or routing messages.

Admin 39 may also enter configuration data to configure MPLS module 48 and, more specifically, CSPF 58 of MPLS module 48. UI module 44 may pass this data to MPLS module 48, which may configure CSPF 58 based on the received configuration data (76). Admin 39 may further interface with a user interface presented by UI module 44 to enter link data associating a link with a cost or other metrics including, for purposes of illustration, a defined extended administrative group (78). UI module 44 may then update routing information 50 based on this received link data in the manner described above (80). In response to updating routing information 50 (or, periodically, in some examples), one or more of interior routing protocol modules 46 may generate an LSA 56 advertising, in this example, the link updated by the link data (which is associated with an extended administrative group), where this LSA 56, because the link is associated with the extended administrative group, includes a repurposed SLRG TLV field identifying the associated extended administrative group in the manner described in this disclosure (82). This one of the interior routing protocol 46 may then transmit this LSA 56, typically, by multicasting this LSA 56 to the other ones of LERs 16 and LSRs 18 (84).

Router 30 may then determine whether it has received any LSAs from other ones of LERs 16 and/or LSRs 18 that advertises any new links, updates to existing links or withdrawn links (e.g., due to link or LER/LSR failure) (86). Assuming that at least one LSA has been received ("YES" 86), routing engine 38 of router 30 may invoke an appropriate one of interior routing protocol modules 46, which parses the received LSA to identify the advertised link and any other costs or metrics associated with the advertised link (88). Referring next to the example of FIG. 3B, when parsing this received LSA, the one of interior routing protocol modules 46 may determine whether the SRLG TLV or other potentially overridden or repurposed field is present in the received LSA (90). If this SRLG TLV is determined to be present in the LSA ("YES" 90), the one of interior routing protocol modules 46 determines a value stored to SRLG TLV field and then determines, in the manner described above, whether the SRLG TLV field has been repurposed based on the value (92, 94).

For example, if the determined value falls within the configured extended administrative group range, the one of interior routing protocol modules 46 determines that the SRLG TLV field has been repurposed to identify an extended administrative group rather than an SRLG ("YES" 96). Alternatively, if the determined value is not included within the configured extended administrative group range, the one of interior routing protocol modules 46 determines that the SRLG TLV field has not been repurposed ("NO" 96). Assuming that the SRLG TLV field has been determined to be repurposed ("YES" 96), the one of interior routing protocol modules 46 determines an extended administrative group from the parsed SRLG TLV value (98) and updates routing information 50 to store the link advertised by the received LSA (including storing the costs and other metrics, such as the determined extended administrative group associated with the link) (100). In response to updating routing information 50 (or, periodically in some instances), MPLS module 48 may then employ CSPF 58 to resolve the routing information 50 to determine updated MPLS forwarding tables 54 and updates IFCs 32 with updated MPLS forwarding tables 54 (102, 104). Alternatively, in some instances, MPLS module 48 resolves routing information 50 to determine updates to existing MPLS forwarding tables 54 and then updates existing MPLS forwarding tables 54 based on these updates rather than overwriting tables 54 with updated tables 54. IFCs 32 may then receive and forward MPLS packets according to updated MPLS forwarding tables 54.

In instances, where the one of interior routing protocol modules 46 does not determine that an SRLG TLV is present within the received LSA ("NO" 90) or when this one of the interior routing protocol modules 46 determine that the SRLG TLV is present ("YES" 90) but has not been repurposed ("NO" 96), the one of interior routing protocol modules 46 update routing information 50 in the customary manner to store the link advertised by the received LSA (100). MPLS module 48 may, in these instances, resolve routing information 50 to generate updated MPLS forwarding tables 54 and update IFCs 32 with updated MPLS forwarding tables 54 (102, 104). IFCs 32 then proceed to receive and forward MPLS packets according to tables 54 (106). In some instances, the one of interior routing protocol modules 46 may not receive an LSAs ("NO" 86), whereupon MPLS module 48 may resolve routing information 50 to determine forwarding tables 54 (assuming that routing information 50 was updated by link data) and updates IFCs 32 with these tables 54, whereupon IFCs 32 receive and forward MPLS packets according to tables 54 (102-106). Router 30 may continue to operate in this manner, transmitting and receiving LSAs to updated routing information 50, resolving routing information 50 to generate MPLS forwarding tables 54, updating IFCs 32 with updated tables 54 and receiving and forwarding MPLS packets according to tables 54 with IFCs 32 (82-106).

Figure 4:
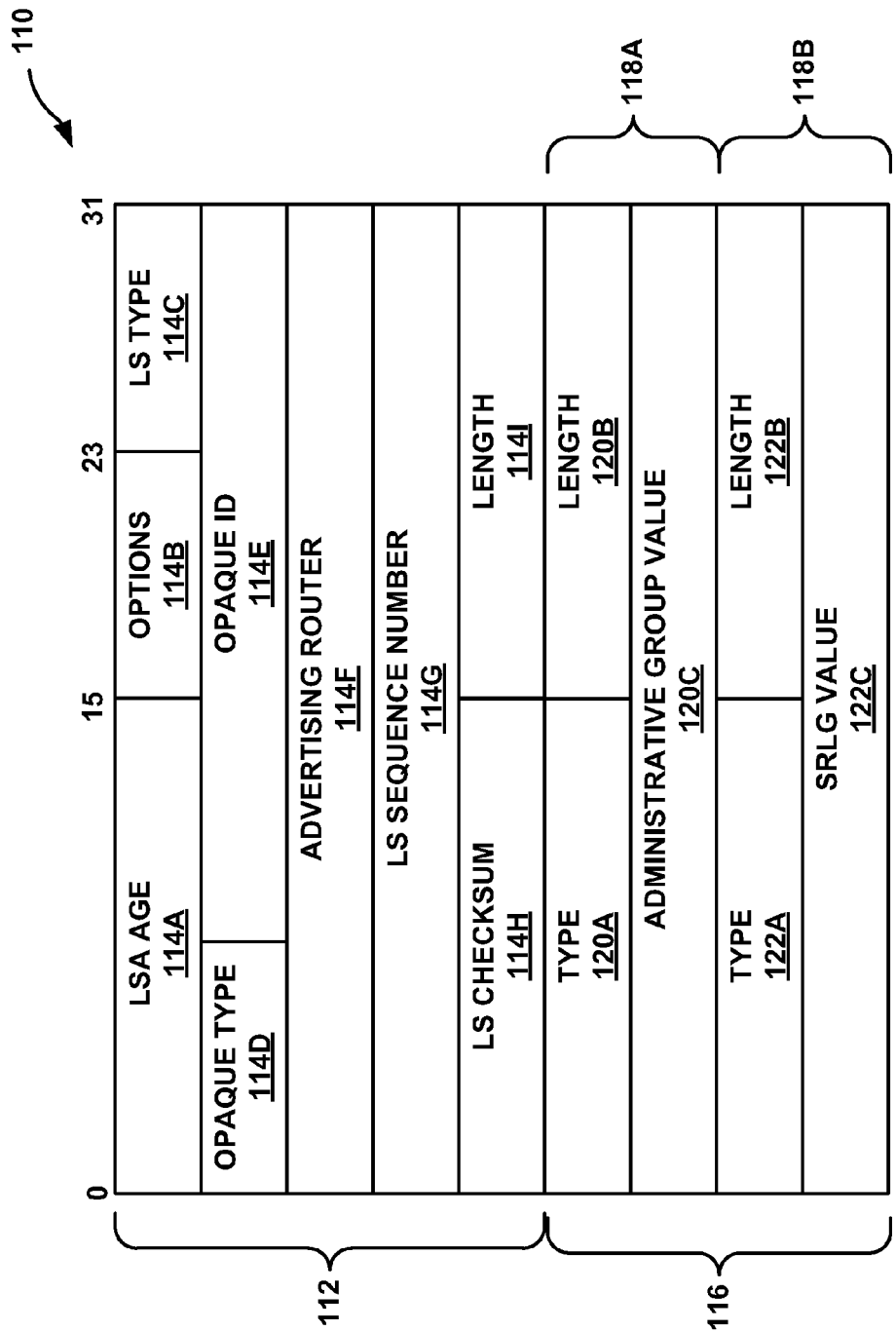
FIG. 4 is a block diagram illustrating an exemplary Link State Advertisement (LSA) that includes a potentially repurposed field in accordance with techniques described in this disclosure.

FIG. 4 is a block diagram illustrating an exemplary Link State Advertisement (LSA) 110 that includes a potentially repurposed field in accordance with techniques described in this disclosure. Moreover, LSA 110, as shown in the example of FIG. 4, may comply with the OSPF protocol in that it adheres to the four byte width limitation specified by the OSPF protocol. That is, LSA 110 comprises a set of four-byte rows, as reflected in FIG. 4 by the 0-31 bit range for each row shown at the top of LSA 110. Further details of the format of opaque OSPF LSAs can be found in RCE 5250, Internet Engineering Task Force (IETF), July 2008 herein incorporated by reference. While described with respect to OSPF routing protocol, the techniques may be similarly implemented with respect to any other interior routing protocol, such as the IS-IS routing protocol.

As shown in FIG. 4, LSA 110 includes an LSA header 112. LSA header 112 comprises an LSA age field 114A ("LSA age 114A"), an options field 114B ("option 114B"), an LS type field 114C ("LS type 114C"), a link state identifier field divided into an opaque type field 114D ("opaque type 114D") and an opaque ID field 114E ("opaque ID 114E"), an advertising router field 114F ("advertising router 114F"), a link state sequence number field 114G ("LS sequence number 114G"), a link state checksum field 114H ("LS checksum 114H") and a length field 114I ("length 114I"). Although shown as comprising fields 114A-114I ("fields 114"), LSA header 112 may comprise more or less fields 114 shown in FIG. 4.

LS age field 114A typically specifies the age of the LSA 110 in seconds and is used to distinguish between two LSAs specifying the same LSA sequence number in their respective LS sequence number field 114F. Options field 114B may specify which optional capabilities are associated with the LSA 110. LS type field 114C indicates the format and function of the LSA 110, i.e., the type of LSA. Particular to opaque LSAs, LS type field 114C may identify the topological range of distribution of LSA 110. For example, if LS type field 114C stores a "9," LSA 110 associated with LSA header 110 is distributed on a link-local scope, indicating that LSA 110 is not to be flooded beyond a local (sub) network. Alternatively, if LS type field 114C stores a "10," LSA 110 is distributed on an area-local scope, indicating that LSA is not to be flooded beyond their area of origin. Generally, LS type field 114C can be any value within the range of 9-11 for opaque LSAs, where a value of "11" indicates that LSA 110 can be flooded throughout an entire autonomous system. LS type filed 114C may, therefore, indicate whether LSA 110 is an intra or inter area opaque LSA.

The link state ID field typically identifies a portion of the routing domain that is being described by LSA 110. For opaque LSAs, such as LSA 110, the link-state ID of the opaque LSA is divided into opaque type field 114D and opaque ID 114E. An opaque type set to "1" indicates a traffic engineering LSA. LSA 110 may generally comprise an opaque type field 114D set to "1" to indicate that opaque information 116 relates to traffic engineering. Alternatively, opaque type field 114D may be set to any other value agreed upon to indicate that opaque information 116 stores other types of information. Opaque ID field 114E defines a unique ID identifying the portion of the routing domain that is being described by LSA 110. Advertising router field 114E may specify the OSPF router identifiers of the LSA 110's originator. LS sequence number field 114F may comprise a signed 32-bit integer that OSPF modules use to detect old and duplicate LSAs. LS checksum field 114G may indicate whether the LSA accompanying LSA header 112 contains errors, which may be employed to discard possibly faulty LSAs 110. Length field 114H indicates the length of LSA 110. More information regarding general OSPF and the headers of OSPF LSA can be found in RFC 3630, entitled "Traffic Engineering (TE) Extensions to OSPF Version 2," the entire contents of which are incorporated by reference as if set forth in their entirety herein.

Opaque information 116 includes two or more TLVs, where only two TLVs 118A and 118B are shown for ease of illustration purposes. TLV 118A represents an Administrative Group TLV and may be referred to as "Administrative Group TLV 118A." TLV 118B represents an SLRG TLV and may be referred to as "SLRG TLV 118B." TLVs 118A, 118B may be referred to as sub-TLVs 118A, 118B considering that LSA 110 is specified as a TLV itself. Administrative Group TLV 118A includes a type portion 120A, a length portion 120B and an administrative group value portion 120C. Likewise, Administrative Group TLV 118B includes a type portion 122A, a length portion 122B and an SRLG value portion 122C. Type portion 120A is set to nine (9) so as to identify value portion 120C of this TLV 118A as identifying an administrative group, while type portion 122A of SRLG TLV 118B is set to 16 to identify value portion 122C of this TLV field as identifying an SRLG. Length portion 120B of Administrative Group TLV 118A is set to specify that the following administrative group value 120C is 4 octets or 32 bits in length. Length portion 122B of SRLG TLV 118B may be set to any multiple of 4 octets or 32 bits, as SRLG TLV 118B may specify more than one 4 octet SRLG value 122C portion, where each 4 octet SRLG value portion 122C may associate the advertised link with a different SRLG.

LSA 110 may include other fields and the various fields described above may be referred to as sub-TLVs when referenced in the context of other TLVs that are not shown in LSA 110. For example, there may be a link TLV between Administrative Group TLV 118A and header 112. This link TLV may have a type of two and administrative group TLV 118A and SRLG TLV 118B may be referred to as sub-TLVs 118A, 118B with respect to this link TLV, which is not shown for ease of illustration purposes. This link TLV may include other sub-TLVs not shown in the example of FIG. 4. In addition, while shown as including Administrative Group TLV 118A, LSA 110 need not include Administrative Group TLV 118A. The techniques may be implemented with respect to SRLG TLV 118B regardless of whether or not LSA 110 includes Administrative Group TLV 118A.

While described above with respect to OSPF LSA 110, IS-IS formatted Link State Protocol Data Units (PDU), which may be abbreviated as LSPs, may be similar in construction to OSPF LSA 110, except for defining different values for the type of the Administrative Group TLV and the SRLG TLV, which are described above in more detail. The format and general construction of IS-IS TLVs may be found in the above incorporated RFCs 5305 and 5307.

Various aspects of the techniques have been described. These and other aspects are within the scope of the following claims.

The invention claimed is:

1. A method comprising:
   receiving, with a network device, a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol and comprises a shared risk link group (SRLG) type-length-value (TLV) field defined by the routing protocol to have a type portion, a length portion and a value portion, wherein the type portion of the SRLG TLV field identifies the second data stored by the value portion of the SRLG TLV field as associating the advertised link with a SRLG, and wherein the administrative group field comprises an administrative group TLV field defined by the routing protocol to have a type portion, a length portion and a value portion, wherein the type portion of the Administrative Group TLV field identifies the first data stored by the value portion of the Administrative Group TLV field as associating the advertised link with the one or more administrative groups in accordance with the routing protocol;
   determining, with the network device, that the field of the received routing protocol message has been repurposed to store second data in addition to the first data, wherein the second data specifies one or more extended administrative groups for the link different from the one or more administrative groups that are to be specified by the administrative group field;
   upon determining that the field has been repurposed, updating routing information to associate the advertised link with the one or more extended administrative groups specified by the second data; and
   performing, with the network device, path selection to select one or more paths based on the updated routing information.

2. The method of claim 1, further comprising receiving configuration data from a user that specifies a range of values of the first data that are to be repurposed to specify the second data,
   wherein determining whether the field of the received protocol message has been repurposed to specify second data comprises:
   determining whether the field stores the first data identifying a value that is included within the range of values specified by the configuration data; and
   determining that the field of the received routing protocol message has been repurposed to specify the second data associating the link with the one or more extended administrative groups based on the determination that the field stores the first data identifying a value that is included within the range of values specified by the configuration data.

3. The method of claim 1,
   wherein the routing protocol comprises an Open Shortest Path First (OSPF) routing protocol,
   wherein the routing protocol message comprises a link state advertisement (LSA), Administrative Group TLV, and
   wherein the type portion of the SRLG TLV field stores a value of sixteen to indicate that the value portion of the SRLG TLV field associates the advertised link with the SRLG in accordance with the OSPF routing protocol.

4. The method of claim 1,
   wherein the routing protocol comprises an Intermediate System to Intermediate System (IS-IS) routing protocol,
   wherein the routing protocol message comprises a Link State Protocol Data Unit, Administrative Group TLV, and
   wherein the type portion of the SRLG TLV field stores a value of 138 to indicate that the value portion of the SRLG TLV field associates the advertised link with the SRLG in accordance with the IS-IS routing protocol.

5. The method of claim 1, further comprising:
   receiving configuration data from a user that specifies a range of values of the first data that are to be repurposed to specify the second data;
   receiving link data from a user that associates at least one of the extended administrative groups with a link that is different from the link advertised by the received routing protocol message, wherein the advertised link comprises a first link and the link that is different from the advertised link comprises a second link;
   generating a routing protocol message to advertise the second link, wherein the routing protocol message to advertise the second link comprises the repurposed SRLG field for storing a value within the range of values to associate the link with one of the extended administrative groups rather than one or more SRLGs, and wherein the SRLG field is different than the administrative group field defined by the routing protocol; and
   transmitting the routing protocol message to advertise the second link to adjacent network devices.

6. The method of claim 1, wherein performing path selection comprises performing a Constrained Shortest Path First (CSPF) path selection algorithm to select the one or more paths based on the updated routing information.

7. The method of claim 6, further comprising receiving configuration data from a user that defines one or more constraints that constrains path selection as performed by the CSPF path selection algorithm,
   wherein the one or more constraints comprise the one or more extended administrative groups,
   wherein the updated routing information comprises a graph data structure having nodes that represent network devices and edges that represent links;
   wherein performing the CSPF path selection algorithm includes:
   pruning the graph data structure based on the constraints to generate a pruned graph data structure; and
   selecting the one or more paths based on the pruned graph data structure.

8. The method of claim 1, wherein performing path selection comprises performing path selection with a multiprotocol label switching (MPLS) protocol module executing within the network device to resolve the routing information in order to generate at least one MPLS forwarding table, wherein the MPLS forwarding table includes entries that are each associated with a different label, wherein each of the entries defines an action that is to be taken with respect to an incoming MPLS packet having a label stack that includes the label associated with the corresponding entry, wherein the action includes one or more of pushing a different label onto the label stack, swapping the label of the label stack with a different label and popping the label from the label stack.

9. The method of claim 1, wherein the network device comprises one of a label switching router (LSR) or a label edge router (LER).

10. A network device comprising:
at least one interface that receives a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol;
a hardware control unit that receives configuration data from a user that specifies a range of values of the first data that are to be repurposed to specify second data, receives link data from a user that associates at least one of the extended administrative groups with a link that is different from the link advertised by the received routing protocol message, determines that the field of the received routing protocol message has been repurposed to store the second data in addition to the first data, wherein the second data specifies one or more extended administrative groups for the link different from the one or more administrative groups that are to be specified by the administrative group field, upon determining that the field has been repurposed, update routing information to associate the advertised link with the one or more extended administrative groups specified by the second data perform path selection to select one or more paths based on the updated routing information, and generates a routing protocol message to advertise the link that is different from the link advertised by the received routing protocol message, wherein the routing protocol message to advertise the second link comprises a repurposed shared risk link group (SRLG) field for storing a value within the range of values to associate the link with one of the extended administrative groups rather than one or more SRLGs, and wherein the SRLG field is different than the Administrative Group field defined by the routing protocol,
wherein the at least one interface transmits the routing protocol message to advertise the second link to adjacent network devices.

11. The network device of claim 10, wherein the control unit further receives configuration data from a user that specifies a range of values of the first data that are to be repurposed to specify the second data, determines whether the field stores the first data identifying a value that is included within the range of values specified by the configuration data and determines that the field of the received routing protocol message has been repurposed to specify the second data associating the link with the one or more extended administrative groups based on the determination that the field stores the first data identifying a value that is included within the range of values specified by the configuration data.

12. The network device of claim 10,
wherein the administrative group field comprises an administrative group type-length-value (TLV) field defined by the routing protocol to have a type portion, a length portion and a value portion, wherein the type portion of the Administrative Group TLV field identifies the first data stored by the value portion of the Administrative Group TLV field as associating the advertised link with the one or more administrative groups in accordance with the routing protocol, and
wherein the field of the received routing protocol message comprises another SRLG TLV field defined by the routing protocol to have a type portion, a length portion and a value portion, wherein the type portion of the SRLG TLV field identifies the second data stored by the value portion of the SRLG TLV field as associating the advertised link with a SRLG.

13. The network device of claim 12,
wherein the routing protocol comprises an Open Shortest Path First (OSPF) routing protocol,
wherein the routing protocol message comprises a link state advertisement (LSA), Administrative Group TLV, and
wherein the type portion of the SRLG TLV field stores a value of sixteen to indicate that the value portion of the SRLG TLV field associates the advertised link with the SRLG in accordance with the OSPF routing protocol.

14. The network device of claim 12,
wherein the routing protocol comprises an Intermediate System to Intermediate System (IS-IS) routing protocol,
wherein the routing protocol message comprises a Link State Protocol Data Unit, Administrative Group TLV, and
wherein the type portion of the SRLG TLV field stores a value of 138 to indicate that the value portion of the SRLG TLV field associates the advertised link with the SRLG in accordance with the IS-IS routing protocol.

15. The network device of claim 10, wherein the control unit further performs a Constrained Shortest Path First (CSPF) path selection algorithm to select the one or more paths based on the updated routing information.

16. The network device of claim 15, wherein the control unit receives configuration data from a user that defines one or more constraints that constrains path selection as performed by the CSPF path selection algorithm,
wherein the one or more constraints comprise the one or more extended administrative groups,
wherein the updated routing information comprises a graph data structure having nodes that represent network devices and edges that represent links, and
wherein the control unit further prunes the graph data structure based on the constraints to generate a pruned graph data structure and selects the one or more paths based on the pruned graph data structure.

17. The network device of claim 10, wherein the control unit further performs path selection with a multiprotocol label switching (MPLS) protocol module executing within the network device to resolve the routing information in order to generate at least one MPLS forwarding table, wherein the MPLS forwarding table includes entries that are each associated with a different label, wherein each of the entries defines an action that is to be taken with respect to an incoming MPLS packet having a label stack that includes the label associated with the corresponding entry, wherein the action includes one or more of pushing a different label onto the label stack, swapping the label of the label stack with a different label and popping the label from the label stack.

18. The network device of claim 10, wherein the network device comprises one of a label switching router (LSR) or a label edge router (LER).

19. A network system comprising: two or more customer networks; and
a transport network that includes a plurality of routers, wherein at least two of the
plurality of routers couple the two or more customer networks to the transport network, wherein a first one of the plurality of routers includes: at least one interface that receives a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol;
a hardware control unit that determines that the field of the received routing protocol message has been repurposed to store the second data in addition to the first data, wherein the second data specifies one or more extended administrative groups for the link different from the one or more administrative groups that are to be specified by the administrative group field, upon determining that the field has been repurposed, update routing information to associate the advertised link with the one or more extended administrative groups specified by the second data, data and perform path selection to select one or more paths based on the updated routing information receives configuration data from a user that specifies a range of values of the first data that are to be repurposed to specify second data, receives link data from a user that associates at least one of extended administrative groups with a link that is different from the link advertised by the received routing protocol message, and generates a routing protocol message to advertise the link that is different from the link advertised by the received routing protocol message, wherein the routing protocol message to advertise the link that is different from the link advertised by the received routing protocol message comprises a repurposed shared risk link group (SRLG) field for storing a value within the range of values to associate the link with one of the extended administrative groups rather than one or more SRLGs, and wherein the SRLG field is different than the Administrative Group field defined by the routing protocol, and
wherein the at least one interface transmits the routing protocol message to advertise the second link to adjacent ones of the plurality of routers.

20. A non-transitory computer-readable device comprising instructions that, when executed, cause one or more processors to:
receive a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol and comprises a shared risk link group (SRLG) type-length-value (TLV) field defined by the routing protocol to have a type portion, a length portion and a value portion, wherein the type portion of the SRLG TLV field identifies the second data stored by the value portion of the SRLG TLV field as associating the advertised link with a SRLG, and, and wherein the administrative group field comprises an administrative group TLV field defined by the routing protocol to have a type portion, a length portion and a value portion, wherein the type portion of the Administrative Group TLV field identifies the first data stored by the value portion of the Administrative Group TLV field as associating the advertised link with the one or more administrative groups in accordance with the routing protocol;
determine that the field of the received routing protocol message has been repurposed to store second data in addition to the first data, wherein the second data specifies one or more extended administrative groups for the link different from the one or more administrative groups that are to be specified by the administrative group field;
upon determining that the field has been repurposed, update routing information to associate the advertised link with the one or more extended administrative groups specified by the second data; and
perform path selection to select one or more paths based on the updated routing information.

21. The computer-readable device of claim 20, further comprising instruction that, when executed, cause the one or more processors to:
receive configuration data from a user that specifies a range of values of the first data that are to be repurposed to specify the second data;
determine whether the field stores the first data identifying a value that is included within the range of values specified by the configuration data; and
determine that the field of the received routing protocol message has been repurposed to specify the second data associating the link with the one or more extended administrative groups based on the determination that the field stores the first data identifying a value that is included within the range of values specified by the configuration data.

22. The non-transitory computer-readable device of claim 20,
wherein the routing protocol comprises an Open Shortest Path First (OSPF) routing protocol,
wherein the routing protocol message comprises a link state advertisement (LSA), Administrative Group TLV, and
wherein the type portion of the SRLG TLV field stores a value of sixteen to indicate that the value portion of the SRLG TLV field associates the advertised link with the SRLG in accordance with the OSPF routing protocol.

23. The non-transitory computer-readable device of claim 20,
wherein the routing protocol comprises an Intermediate System to Intermediate System (IS-IS) routing protocol,
wherein the routing protocol message comprises a Link State Protocol Data Unit, Administrative Group TLV, and
wherein the type portion of the SRLG TLV field stores a value of 138 to indicate that the value portion of the SRLG TLV field associates the advertised link with the SRLG in accordance with the IS-IS routing protocol.

24. The non-transitory computer-readable device of claim 20, further comprising instruction that, when executed, cause the one or more processors to:
receive configuration data from a user that specifies a range of values of the first data that are to be repurposed to specify the second data;
receive link data from a user that associates at least one of the extended administrative groups with a link that is different from the link advertised by the received routing protocol message, wherein the advertised link comprises a first link and the link that is different from the advertised link comprises a second link;
generate a routing protocol message to advertise the second link, wherein the routing protocol message to advertise the second link comprises a repurposed shared risk link group (SRLG) field for storing a value within the range of values to associate the link with one of the extended administrative groups rather than one or more SRLGs, and wherein the SRLG field is different than the administrative group field defined by the routing protocol; and
transmit the routing protocol message to advertise the second link to adjacent network devices.

25. The non-transitory computer-readable device of claim 20, further comprising instruction that, when executed, cause the one or more processors to perform a Constrained Shortest Path First (CSPF) path selection algorithm to select the one or more paths based on the updated routing information.

26. The non-transitory computer-readable device of claim 25, further comprising instruction that, when executed, cause the one or more processors to:
receive configuration data from a user that defines one or more constraints that constrains path selection as performed by the CSPF path selection algorithm, wherein the one or more constraints comprise the one or more extended administrative groups, and wherein the updated routing information comprises a graph data structure having nodes that represent network devices and edges that represent links;
prune the graph data structure based on the constraints to generate a pruned graph data structure; and
select the one or more paths based on the pruned graph data structure.

27. The non-transitory computer-readable device of claim 20, further comprising instruction that, when executed, cause the one or more processors to perform path selection with a multiprotocol label switching (MPLS) protocol module executing within the network device to resolve the routing information in order to generate at least one MPLS forwarding table, wherein the MPLS forwarding table includes entries that are each associated with a different label, wherein each of the entries defines an action that is to be taken with respect to an incoming MPLS packet having a label stack that includes the label associated with the corresponding entry, wherein the action includes one or more of pushing a different label onto the label stack, swapping the label of the label stack with a different label and popping the label from the label stack.

28. The non-transitory computer-readable device of claim 20, wherein the one or more processors are included within one of a label switching router (LSR) or a label edge router (LER).

29. A method comprising:
receiving, with a network device, a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol;
determining, with the network device, that the field of the received routing protocol message has been repurposed to store second data in addition to the first data, wherein the second data specifies one or more extended administrative groups for the link different from the one or more administrative groups that are to be specified by the administrative group field;
upon determining that the field has been repurposed, updating routing information to associate the advertised link with the one or more extended administrative groups specified by the second data;
performing, with the network device, path selection to select one or more paths based on the updated routing information,
receiving, with the network device, configuration data from a user that specifies a range of values of the first data that are to be repurposed to specify second data;
receiving, with the network device, link data from a user that associates at least one of extended administrative groups with a link that is different from the link advertised by the received routing protocol message;
generating, with the network device, a routing protocol message to advertise the link that is different from the link advertised by the received routing protocol message, wherein the routing protocol message to advertise the second link comprises a repurposed shared risk link group (SRLG) field for storing a value within the range of values to associate the link with one of the extended administrative groups rather than one or more SRLGs, and wherein the SRLG field is different than the Administrative Group field defined by the routing protocol;
transmitting, with the network device, the routing protocol message to advertise the second link to adjacent ones of the plurality of routers.

30. A method comprising:
receiving, with a network device, a routing protocol message that advertises a link, wherein the routing protocol message includes a field for storing first data associated with the link in accordance with the routing protocol, and wherein the field is defined by the routing protocol as a type of field having a different function from an administrative group field as defined by the same routing protocol;
determining, with the network device, that the field of the received routing protocol message has been repurposed to store second data in addition to the first data, wherein the second data specifies one or more extended administrative groups for the link different from the one or more administrative groups that are to be specified by the administrative group field;
upon determining that the field has been repurposed, updating routing information to associate the advertised link with the one or more extended administrative groups specified by the second data;
receiving configuration data from a user that defines one or more constraints that constrains path selection as performed by a Constrained Shortest Path First (CSPF) path selection algorithm, wherein the one or more constraints comprise the one or more extended administrative groups, and wherein the updated routing information comprises a graph data structure having nodes that represent network devices and edges that represent links; and
performing, with the network device, a Constrained Shortest Path First (CSPF) path selection algorithm to prune the graph data structure based on the constraints and select the one or more paths based on the pruned graph data structure.

* * * * *

UNITED STATES PATENT AND TRADEMARK OFFICE
CERTIFICATE OF CORRECTION

Page 1 of 1

PATENT NO.          : 8,634,418 B2
APPLICATION NO.     : 13/174962
DATED               : January 21, 2014
INVENTOR(S)         : Ambrose Kwong et al.

It is certified that error appears in the above-identified patent and that said Letters Patent is hereby corrected as shown below:

Title page, item (75) Inventors: Harish Sitaraman's city is listed as "Waldam, MA (US);".
Harish Sitaraman's city should be corrected to "Waltham, MA (US);"

Signed and Sealed this
Fifteenth Day of December, 2015

Michelle K. Lee
*Director of the United States Patent and Trademark Office*